(12) United States Patent
Wieth

(10) Patent No.: US 9,667,295 B2
(45) Date of Patent: May 30, 2017

(54) HOLDER FOR A MOBILE TELECOMMUNICATIONS TERMINAL

(71) Applicants: Andreas Filosi, Puchheim (DE); Franz Wieth, Puchheim (DE)

(72) Inventor: Franz Wieth, Puchheim (DE)

(73) Assignees: Andreas Filosi, Puchheim (DE); Franz Wieth, Puchheim (DE)

( * ) Notice: Subject to any disclaimer, the term of this patent is extended or adjusted under 35 U.S.C. 154(b) by 0 days.

(21) Appl. No.: 15/030,120

(22) PCT Filed: Oct. 17, 2014

(86) PCT No.: PCT/EP2014/072378
§ 371 (c)(1),
(2) Date: Apr. 18, 2016

(87) PCT Pub. No.: WO2015/055851
PCT Pub. Date: Apr. 23, 2015

(65) Prior Publication Data
US 2016/0241289 A1 Aug. 18, 2016

(30) Foreign Application Priority Data

Oct. 17, 2013 (DE) .................. 10 2013 111 478

(51) Int. Cl.
*H04M 1/00* (2006.01)
*H04B 1/3877* (2015.01)
*B62B 3/14* (2006.01)
*G06F 1/16* (2006.01)
*H04M 1/04* (2006.01)
*H04W 12/08* (2009.01)
*H04M 1/725* (2006.01)

(52) U.S. Cl.
CPC ......... *H04B 1/3877* (2013.01); *B62B 3/1428* (2013.01); *G06F 1/1632* (2013.01); *H04M 1/04* (2013.01); *H04W 12/08* (2013.01); *H04M 1/72527* (2013.01)

(58) Field of Classification Search
USPC .................. 455/575.1, 550.1, 556.1, 566
See application file for complete search history.

(56) References Cited

U.S. PATENT DOCUMENTS

| | | | |
|---|---|---|---|
| 2010/0264182 A1* | 10/2010 | Perlman | H04M 1/04 224/409 |
| 2014/0069973 A1* | 3/2014 | Peck | B60R 11/02 224/411 |

(Continued)

FOREIGN PATENT DOCUMENTS

| | | | |
|---|---|---|---|
| DE | 202011051891 U1 | 11/2011 | |
| FR | 2975557 A1 | 11/2012 | |

(Continued)

*Primary Examiner* — Fayyaz Alam
(74) *Attorney, Agent, or Firm* — Laurence A. Greenberg; Werner H. Stemer; Ralph E. Locher

(57) ABSTRACT

A holder for a mobile telecommunications terminal, in particular a smartphone, has a receptacle for the terminal. The holder has a first locking mechanism by which the smartphone can be locked in the receptacle. There is also described a system for fastening a smartphone to a shopping trolley handle, a base station for accommodating a plurality of holders and a method for fastening a smartphone to a shopping trolley handle.

15 Claims, 3 Drawing Sheets

(56) References Cited

U.S. PATENT DOCUMENTS

2014/0265185 A1* 9/2014 Mersky ............... B62B 3/1428
                                                    280/33.992
2014/0339278 A1* 11/2014 Ditore ..................... B62B 5/00
                                                       224/411
2014/0375456 A1    12/2014 Sonnendorfer et al.
2015/0032559 A1     1/2015 Sonnendorfer et al.
2016/0207557 A1*   7/2016 Olivieri ............... B62B 3/1408

FOREIGN PATENT DOCUMENTS

| WO | 2013053567 A1 | 4/2013 |
| WO | 2013153204 A1 | 10/2013 |

* cited by examiner

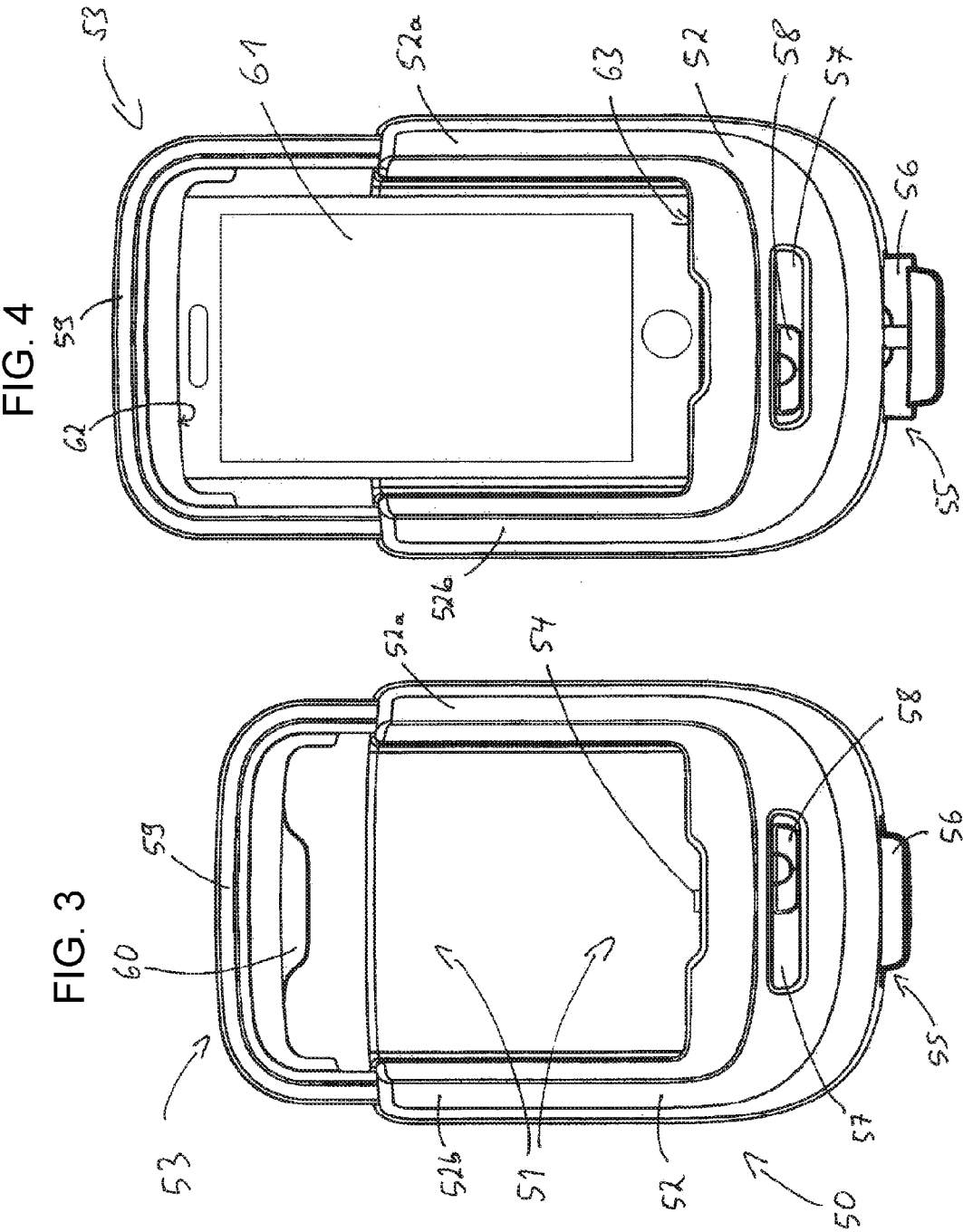

HOLDER FOR A MOBILE TELECOMMUNICATIONS TERMINAL

BACKGROUND OF THE INVENTION

Field of the Invention

The invention relates to a holder for a mobile telecommunications terminal, in particular a smartphone, wherein the holder has a receptacle for the smartphone, the holder having a first locking mechanism with which the smartphone can be locked in the receptacle, and the holder having a releaser for unlocking a second locking mechanism, with which the holder can be locked to a shopping trolley. The invention further relates to a system for fastening a smartphone to a shopping trolley handle, a base station for accommodating a plurality of holders and a method for fastening a smartphone to a shopping trolley handle.

BRIEF SUMMARY OF THE INVENTION

This application adopts the content disclosed in PCT/EP2013/057695 which was published posterior. The object of the present application is to propose advantageous extensions, simplifications and/or alternatives to the holders, the interfaces and fastening means described there, and to the base station for providing the holder also described there, with which the holder, the receiving station for the holders and the payment system for the wholesale and retail trade presented there can be further improved.

This problem is solved by means of a holder having the features as claimed. A payment system comprising the holder according to the invention for the wholesale and retail trade is claimed as well. A claim relates to the base station in which the holders are provided ready for use. A claim relates to a method according to the invention for mounting a smartphone on a shopping trolley handle. Particularly advantageous embodiments are discussed in the respective dependent claims.

An essential aspect of the invention is the holder which can be fastened and locked to a shopping cart or the handle thereof, and with which a mobile telecommunications terminal, a so-called smartphone, brought into a shop by the customer, can be fastened to the shopping trolley. The smartphone seated in the holder can also be locked in place there, so that any unauthorized removal of the smartphone inserted in the holder on the shopping trolley can be prevented. Locking for the purposes of this application means a blocking produced by a positive-locking fit, which is released again not by deformation of the locking bolt, but by removal of the lock from its blocking position.

The holder provided for the smartphone has a receptacle in which the smartphone can be kept in a locked position. In addition to the first locking system necessary for this purpose, it comprises elements of a second locking system, with which the holder can be securely fastened to the shopping trolley handle. To prevent unauthorized removal of the smartphone from the holder it is proposed to enable the release of the first locking mechanism only after an authorisation check.

Hereafter, individual features of the invention are explained in greater detail.

Because of the different sizes of smartphones, it is advantageous if the receptacle is capable of accommodating types of smartphone of different sizes. In a preferred embodiment the receptacle forms a frame for these, which has a contact surface protruding inwards for the side areas of the smartphone. This allows a certain degree of tolerance in terms of the width of smartphones that can be accommodated. All that is required in doing so is to take care to ensure that the camera on the back of the smartphone is not concealed by the protruding contact face.

It is also advantageous if the accommodation area is greater in length than the smartphones for which it is provided. It is then possible to move the smartphone that is seated in the receptacle with a carriage that can move along the longitudinal direction of the receptacle. This ensures that the smartphone is guided against one of the transverse sides of the frame and held there. This allows smartphones of different length to be received and accommodated in the receptacle. If the carriage is lockable, then a separate locking system for the smartphone is also no longer required. To further improve the retention of the smartphone in the receptacle, the carriage and/or the transverse side of the frame against which the smartphone is guided by the carriage can have undercuts on a side which is facing the contact surface, into which the ends of the smartphone engage. This allows even better protection against unauthorized removal.

It is also advantageous if at least the contact surface of the carriage provided for the smartphone can be tilted upwards. The smartphone to be placed in the receptacle can then be placed more easily onto the carriage. On the carriage an electronic wired interface for the smartphone is provided, which can be connected to the smartphone. This is preferably a standardized interface in the form of a micro-USB connector. Therefore the tilt of the carriage also facilitates the connection of the smartphone to the interface, which is usually effected by insertion of the smartphone on this interface.

It has been found that some of the interface functions described in PCT/EP2013/057695 above are not absolutely necessary. The first interface described there for the transmission of data from the mobile telecommunications terminal to the holder and the second interface for transmission of data from the holder to a till system, as is the case for the third and fourth interface described there for the transmission of energy and their associated features, such as the induction charging of the smartphone, are now only to be regarded as optional.

In the event of the carriage being tipped back into the starting position, the smartphone connected to the interface rests on the contact surface protruding from the side of the frame and can subsequently be guided against the reverse side of the frame opposite the carriage and there guided underneath the undercut, if present.

It is particularly advantageous if the carriage is pushed against a spring force. This spring tension can be used to provide energy for a locking mechanism. As already shown, due to the different lengths of smartphones the distance to be traveled by the retaining carriage is different for each smartphone type. If the respective end position is reached, the smartphone is clamped in place, or held, with a defined pre-tensioning. Once the defined pre-tensioning is reached, the locking mechanism is released and the carriage is blocked. The locking of the carriage at any point in its travel is preferably effected by engagement in a gear teeth arrangement, or openings provided in the receptacle. The locking elements, for example in the form of pins which are held moveably on the carriage, are then inserted mechanically into the gear teeth or opening by the force exerted by the customer. The resulting positive-locking fit blocks the carriage in the end position that is reached.

Since this force must be applied by the customer, it is advantageous to indicate to him when the lock is released. The customer then knows for certain that his smartphone is now correctly locked. In a particularly simple manner, this can be done using a light signal emitted by an LED. This LED should be clearly visible to the customer on the holder.

In an alternative embodiment, instead of the movable carriage the holder has an adjustable retaining bracket which surrounds part of the accommodation area where it bounds the contact surface for the smartphone. The retaining bracket is movable and in particular fastened to the holder in a spring-loaded manner. Adjusting the position of the retaining bracket changes the length of the accommodation area and thus enables smartphones of different sizes to be accommodated in the holder.

It is advantageous if the retaining bracket is designed to be on the boundary of the accommodation area opposite to the interface. The interface is then constructed on a part of the holder that does not need to be moved, or moved only slightly. The interface can in this case be connected more simply and in a more fail-safe manner.

Preferably the boundary of the accommodation area at which the interface is arranged forms a tilting contact surface for the edge surrounding the smartphone. In this way the contact surface can be tilted upwards together with the interface. As a consequence the longitudinal axis of the interface is no longer oriented parallel to the longitudinal axis of the accommodation area, but rather at an angle thereto. Even a slight rotation of the interface, for example by approximately 30°, facilitates the connection of the smartphone to the interface.

In order to connect to the interface, the smartphone can then be placed along the longitudinal axis of the interface projecting from the accommodation area, and thus at an angle from above, until its edge comes into contact with the contact surface. In a subsequent step, the smartphone which has been placed on the interface can be rotated into the accommodation area together with the contact surface. It does not therefore need to be inserted into the accommodation area first in order to make a connection with the interface.

Particular advantage is obtained in this case if the tiltable surface adopts a rest position in which it is held in a position where it is tilted upwards to receive a smartphone. This is particularly simple to achieve if in its rest position, the contact surface for the smartphone is spring-loaded against an abutment designed for the purpose. The spring tension must be designed only to move the interface into this rest position and to hold it there until it is connected to a smartphone. This means that the subsequent rotation of the smartphone connected to the interface is not more any more difficult.

In the retracted condition the retaining bracket is preferably arranged sufficiently close to the bracket that a smartphone cannot be inserted into the receptacle with its edge resting on the contact surface, but comes to rest with its reverse side on the retaining bracket. Thus a smartphone is safely contained in case it slips from a person's hand when it is being inserted into the receptacle. In this respect, the size of a smartphone is immaterial. A smartphone can rest on the retaining bracket in a central area of its reverse side or more toward the edge, so that smartphones of different sizes can be handled securely.

To fasten the smartphone in the holder, all that is necessary is to pull the retaining bracket far enough out so that the smartphone is able to rest on the contact surface. Subsequently, the retaining bracket is guided, in particular in a spring-loaded manner, against the smartphone resting on the contact surface and holds it firmly in the receptacle.

If the retaining bracket is pulled so far out of the holder that it is possible to insert the smartphone into the receptacle, a tongue arranged on the underside of the retaining bracket or formed from this itself and protruding into the receptacle, prevents the smartphone from falling out. It is advantageous if the tongue is positioned in such a way that a smartphone which has come into contact with it is arranged at least substantially parallel to the longitudinal axis of the receptacle. It is thus guaranteed that, when resetting the retaining bracket, the circumferential edge of the smartphone comes into contact with it. A smartphone resting on the tongue will then always adopt the correct position relative to the retaining bracket. The customer using the holder does not therefore need to adjust the smartphone in the receptacle himself, but can use the tongue as a positioning aid.

Although such holders have the dimensional tolerance described and thus are suitable for different types of smartphones, they cannot cover absolutely all sizes of available smartphones. In addition, the various types of smartphone also differ in the position of their interface on the housing. To enable the system to be used for as many smartphone types as possible, it is necessary to store different types of holder. This leads to the problem of identifying the appropriate smartphone holder from the available holders and providing it to the customer. Particularly suitable identification features are customer cards or the like, which are carried by the customer and associated with information on the smartphone used by the customer. This association can be stored either in the card itself or in a dataset kept outside the card, which is queried when reading the customer card.

As an alternative to a customer card, other cards carried by the customer can be used if they can be assigned to customers. The assignment is made by the customer storing details of a card which he carries, such as one of his credit cards, as identification features. This is particularly simple to achieve at the same time as the registration of the customer.

It is not absolutely necessary for the cards to physically exist. Apps are now available, for example the "Pass Book" app for the iPhone, with which customer and/or credit card data can be stored on the smartphone in electronic form and read out again.

It is particularly advantageous if the holders can be issued automatically. For this purpose the holder is provided in a so-called base station, in which they are secured against unauthorized removal. In a particularly simple method of securing, the locking mechanism consists of a tongue and groove system in which the holder that is placed thereon is secured against removal. For example, the holder has grooves arranged to the side and/or facing backwards, which are pushed onto corresponding bars at the base station. In an end position of the holder at its place in the station, a spring-loaded bolt or pin is arranged in a wall of the station opposite a recess or opening of the holder. Due to the spring tension, the bolt or pin engages in the recess or opening opposite to it and thus by means of a positive-locking fit, blocks the removal of the holder from the tongue and groove system.

After identification of the customer, for example by insertion of a customer card into a reading device stored at the station, the card is checked to determine whether a smartphone is associated with it, and if so, which type. If this check gives a positive result, a further check is made to see whether a holder suitable for this smartphone type is available in the station. If corresponding holders are available, one of these suitable holders is assigned to the customer and made available. This is effected by unlocking the securing device.

If identification of the customer using a smartphone app is offered, then of course appropriate means for reading the data from the smartphone must be kept at the station.

In a preferred embodiment the identification of the customer is carried out on the smartphone using known means of near-field communication. It is possible in particular to transmit the smartphone type even without prior registration of the customer, and to select a suitable holder for them.

Alternatively or in addition to this, the identification is carried out on the basis of biometric features of the customer, for example their fingerprint or retina. The features applied for identification are preferably stored in the holder and/or the base station, in order that they can be queried again later in the procedure. It is also possible to use a code, which must be entered on the smartphone and transmitted over the interface or via near-field communication to unlock the holder and/or the smartphone. This code can be transmitted to the smartphone in advance or entered on the smartphone by the customer when locking the smartphone.

In a particularly preferred type of deployment, a check is made to determine whether multiple suitable holders are available, and if so, which of these has the highest charge level in its energy store. This means that the holder with the largest energy reserves can always be made available to the customer. In this case, in addition to the pure charging function the base station must also comprise sensors for measuring the level of energy stored in the holder.

A simple way to release the locking mechanism is by pushing back the spring-loaded bolt in the direction of the wall of the base station. This can be carried out electromagnetically, for example by using a solenoid connected to the bolt, which is activated after a positive authorization check. If the bolt is no longer engaged in the opening, the holder may be removed without difficulty. In an alternate embodiment, the opening or recess is arranged in the wall of the base station and the spring-loaded bolt in the holder.

It is advantageous to indicate to the customer which of the holders has been provided for him. Here also, the signal is preferably output via LED, the light signal of which identifies either the space for the holder provided, or the holder itself. In a particularly preferred embodiment the signal is triggered by pushing back the bolt.

However, it may happen that the customer does not remove the holder that was provided for him. After the customer has identified himself, he may for example have changed his mind, or been otherwise distracted. In such cases the holder is preferably locked again after the expiry of a specified time, and if appropriate the optional signal is switched off. This also prevents a subsequent customer from inadvertently taking a holder that is not suitable for him.

Accordingly, it is advantageous not to accept the identification of a subsequent customer until the previous customer has removed his holder from the station, or when the non-removed holder has been locked again after expiry of a time period. This measure can also be indicated to the customer by optical or acoustic signals. He is thus informed that he must wait.

Once the customer has removed a holder, he can either first insert the smartphone into the holder or fasten the holder to the push handle of the shopping trolley beforehand. A receptacle is provided on the push handle for this purpose, in which the holder is accommodated and where it can be kept locked. It is of particular advantage if the tongue and groove system for fastening the holder to the shopping trolley handle corresponds to the tongue and groove system for fastening the holder in the station. If this is the case, elements of the tongue and groove system used for mounting the holder in the station can also be used for fastening the holder to the push handle.

Similarly, the locking can also be carried out in a uniform manner. In a particularly preferred embodiment, the locking is also effected by means of a spring-loaded latch, via one or more spring-loaded bolts or pins provided on the shopping trolley handle. The bolt is arranged in the contact surface of the receptacle and slides back into the contact surface under pressure. In the end position of the holder on the push handle it is located opposite to the recess or opening in the holder and can engage with it. In this embodiment not just the elements used for fastening the holder in the station are re-used, but also those for locking it. Due to the positive-locking fit, the bolt seated in the recess or opening blocks removal of the holder from the tongue and groove system of the mechanism fastening the holder to the push handle.

In order to be able to release the lock, it is necessary to push the spring-loaded bolt out of the opening or recess again. This is advantageously carried out by means of a switch or button provided on the holder. If this is depressed, it pushes the bolt or bolts out of the recess or opening. This releases the blocking of the holder and thus facilitates its removal from the tongue and groove system.

Of course it is also possible to provide two independent spring-loaded latches for locking the holder in the station or on the shopping trolley handle at different positions. These can be configured as the alternative embodiment just described or as that already mentioned above. Depending on the specific embodiment, the switch or key must be designed accordingly, for example if the release of the blockade requires the spring-loaded bolt to be withdrawn back into the holder.

An important idea of this invention is to prevent unauthorized unlocking of the holder from the shopping trolley handle with a smartphone inserted. A particularly simple solution to this is to hide the button or switch using the smartphone which is located and locked in the receptacle. The simplest way to achieve this is by arranging the button or switch underneath the smartphone located in the receptacle. In this case, it is absolutely necessary to first release the locking of the smartphone in order to be able to remove the smartphone and so enable the button or switch for unlocking the holder to be exposed and operated.

To prevent unwanted removal of the smartphone from the holder, the lock should preferably be released only after an authorization check. It is made particularly simple if the same method is used to check the authorization as was used in the selection of the holder provided in the station. If the holder has a card reader available, this authorization check can also be carried out using the customer card or similar.

If the holder has a card reader into which the card is inserted, a convenient embodiment allows the card to be used here also as proof of authorization. This is done by using the insertion of the card into the card slot to release the locking mechanism. In a first step, the card is only allowed to be inserted up to a point where a transponder arranged in the reader can check the validity of the card. If the test was positive, continued blocking of the reader slot is cancelled and the card can be fully inserted. Since the full insertion of the card into the card slot is now possible, the locking mechanism is mechanically released. The release of the reader slot can be effected by means of one or more electromagnetically movable magnets, which in the event of a positive test release(s) the reader slot and/or the lock. After the release has taken place, the card can be removed from the slot again.

Alternatively, the customer card can have a specific stamping or perforation, in which a pin arranged in the reader can only engage when the card has been able to be fully inserted into the card slot. If this is the case, the locking mechanism is released and the smartphone can be removed. This is preferably carried out using the same pin which previously blocked the slot.

If cards other than the customer card can be used for identification, the method described above for releasing the locking mechanism by engagement with a stamping or perforation present in the card is usually not possible. In this case, the card slot has a carriage which is provided with the specific stamping or perforation. The card is inserted into the carriage, and then pushed with the carriage into the card slot. Once fully inserted, the pin mounted in the reader can engage with the carriage. In this way, damage to the card is avoided. In this case, to release the blockage in the reader slot a reader assigned to the card slot is used to read out recorded data from the card. This can be an optical reader device, which reads specific digit sequences on the card, a magnetic strip reader, and/or a reader for the chip which may in some cases be incorporated in the card.

Alternatively, the holder can comprise a chip, assigned to the holder and held there in a receptacle, that carries an identification feature, for example, a transponder. The chip is revealed by the holder when the smartphone is locked in the holder. After removal of the chip, unlocking is no longer possible. If the chip is inserted into its receptacle on the holder again, its identification feature is checked to validate its assignment to this holder, and in the event of a positive result the lock is released.

The carriage is now free to move. If the smartphone has been passed underneath an undercut, the carriage must be moved before removing the smartphone, before the smartphone can be removed. Tilting the carriage enables convenient removal of the smartphone, or an easy release of the smartphone from the interface on the carriage.

In a preferred embodiment the carriage is released only if the proof of authorization, for example the customer card, is inserted in the holder. It remains preferably locked in the holder until locking of the first locking mechanism is completed. This has the advantage that the customer receives a confirmation that proper locking has occurred.

The features cited here relating to the carriage can be correspondingly implemented with the alternative embodiment of the receptacle for the smartphone with a retaining bracket. This also applies to the tilting of the interface and the facilities described in relation to the locking/unlocking procedure and their respective advantages. The comments made above apply to the same extent.

Once the smartphone is removed from the holder, the button or switch for unlocking the holder on the shopping trolley handle is freely accessible and can be operated. Finally, the holder, which is now released from the shopping trolley, can be placed back on the base station or returned to a depositing station. It is advantageous if the return of the holder is enforced by means of appropriate measures.

It is advantageous to prevent reinsertion of the holder into the shopping trolley handle. This can prevent any person other than the customer to whom the holder was assigned at the base station from continuing to use the holder. This blockage is preferably released automatically by installing the holder at a position in the base station.

Advantageously, it is also prevented a different smartphone from being locked into a holder already assigned to a customer. This is possible if a customer has removed his smartphone from the holder without returning the holder. It is therefore necessary not only to record the customer and the smartphone type, but an individual identification feature for the smartphone itself as well. Locking is then only possible if the identification feature has been checked and accepted by the holder.

It is advantageous if the payment process with the smartphone at the payment station is linked to the return of the holder. To this end, the payment process is only possible once the holder has been deposited at a specific position. The holder preferably has a readable identification feature, so that the return of the holder can be registered automatically. Particularly suitable devices for this purpose are a transponder, or a bar code attached to the holder. The payment process can be enabled simply by switching the screen of the payment station to an active state. Alternatively the customer is informed by means of appropriate signals that he must first return the holder.

The identification feature of the holder is advantageously also used for identifying the type of the holder located in the base station. This makes it possible to easily replace a holder at any given position in the base station.

In a preferred embodiment the specific location at which the holder must be deposited in order to be able to start the payment process is a base station or a return station. In the case of a return to a base station it will be possible to fill the base station with holders without requiring additional personnel. The base station filled by the customers themselves then needs only to be positioned at a suitable location in the shop for the re-issue of the holders. A particularly simple solution to this is a rotary mechanism with which a base station to be populated with holders on both sides can be rotated by 180°, so that the re-filled holders can be removed again on the opposite side of the payment station. A further advantage of returning the devices to a base station or a suitably equipped return station is that the returned holders are placed onto charging stations so that their energy storage units can be recharged without delay.

It is also advantageous if the use of the holder requires a deposit to be paid, which is returned upon the return of the holder.

In an alternative solution to the problem to that of the holder according to claim 1, there is no releaser concealed by a smartphone held in the receptacle. In the alternative embodiment described in more detail hereafter also, an authorization check is performed and the releaser which releases the first locking mechanism is freely accessible on the holder. The authorization check according to the invention is carried out using a token, which is assigned to a specific holder. The token is inserted into the holder and removed from the base station together with it. Such a token can have a specific geometry which is checked by the holder. Like the previously described customer card, it preferably has a transponder by means of which an electronic authorization check is carried out in the holder. To be able to better differentiate this alternative mechanism from the first locking mechanism, it is designated hereafter as a fastening mechanism.

A particularly advantageous feature of this embodiment is the fact that it can be adapted considerably more flexibly to required variants. Thus the fastening mechanism and the second locking mechanism can preferably be locked or released again together in a single operating step. This facilitates the handling of the holder for the customer, because both the holder and the smartphone fastened in the holder are protected against unauthorized removal by the authorization check in a common operating step.

If the alternative type of support is not used in a shopping trolley, then the corresponding second locking mechanism provided for this purpose can even be completely eliminated and the holder assembled particularly simply. If it is desired to fasten the holder to the shopping trolley but without locking it, then instead of the second locking mechanism another connection means, for example a tongue and groove joint in the form of a dovetail, can be used. In this respect a lockable connection means a second locking mechanism for the purposes of this application, but without its releaser being concealed.

In a particularly preferred embodiment the holder does not have a releaser for the fastening mechanism, but instead a switch or a slider control, the movement of which in one direction locks the fastening mechanism while its movement in the opposite direction releases the fastening mechanism again. Such a slider or switch has the advantage that the required movement can be used by the mechanism not only for unlocking, but also for locking it. Also, the movement required for the locking can additionally be used to clamp the smartphone in its receptacle.

If the customer moves such a slider or switch from the "Open" to the "Closed" position, one or more states are preferably checked before the release of the token. One preferred type of check is whether the holder is properly fastened to the shopping trolley, for example on its handle. This position can be checked by means of a limit switch that signals that the holder has reached the desired end position on the shopping trolley. In order to prevent an undesired release the holder is preferably latched in the end position.

Another preferred type of check is whether a smartphone is properly fastened in the holder. This can also be checked by means of a suitable limit switch. It is also advantageous to check whether a token that can be read is inserted in the holder. This check is also preferably carried out by means of a limit switch, which is triggered by a fully inserted token.

After the smartphone has been locked in the holder and, if present, the holder has been locked to the shopping trolley, the token can be removed from the holder. If a token is inserted which is not permanently assigned to this holder, then before the token is removed its ID must be read out and stored in the holder. Preferably, in the event of a successful authorization check the ID of the token is stored directly in a data memory of the holder.

For the removal, it is advantageous if after locking the smartphone the token is mechanically pushed a short distance out of the holder. This signals to the user that the locking was performed correctly, his smartphone is secured and he can remove the token. For this purpose the fastening mechanism is connected to the mechanics of the insertion opening in such a way that locking of the fastening mechanism brings about a release of the token and a shortening of the depth of the insertion opening that is usable by the token.

Releasing the lock or locks is only possible when a suitable token has been inserted into the opening of the slot in the holder again and the authorization check of the token was positive. If this is the case, the retaining bracket and, if appropriate, the connection means locking the holder to the shopping trolley, is released and the token in the holder is secured against removal.

As already mentioned, before the authorization query a check should preferably be carried out to determine whether a token was introduced into the holder. The previously described mechanism for reducing the usable depth of the insertion opening for the token can also be used for this purpose. If the token is fully inserted into the insertion opening, it comes into contact with the mechanism and pushes it deeper into the insertion opening again. This movement signals that a token has been inserted into the insertion opening.

Before releasing the lock a check can also be made as to whether the holder is fastened to the shopping trolley and/or a smartphone is fastened in the holder. The previously mentioned limit switches can be used for this purpose. If the checks prove positive, in the embodiment with a switch or slider control this can preferably be moved automatically from "Closed" to "Open", but also manually. As a result, the locking of the holder is released and, if present, the locking of the holder to the shopping trolley is released. Now, in any desired order, the holder can be detached from the shopping trolley, the receptacle for the smartphone opened and the smartphone removed from the holder.

The embodiments described in this application as being alternative to each other can have all the other features described for the other respective embodiment and make use of their advantages. In this respect the other features or method steps described in the respective context can be used not only for the respective embodiment, but also for the alternative embodiment.

BRIEF DESCRIPTION OF THE SEVERAL VIEWS OF THE DRAWING

A preferred design variant of the holder according to the invention with a locking mechanism is described in detail on the basis of four drawing figures. In these, FIG. 3 shows a plan view onto the holder, and FIG. 4 shows a similar plan view of the device with a smartphone inserted.

DESCRIPTION OF THE INVENTION

Figure 1:
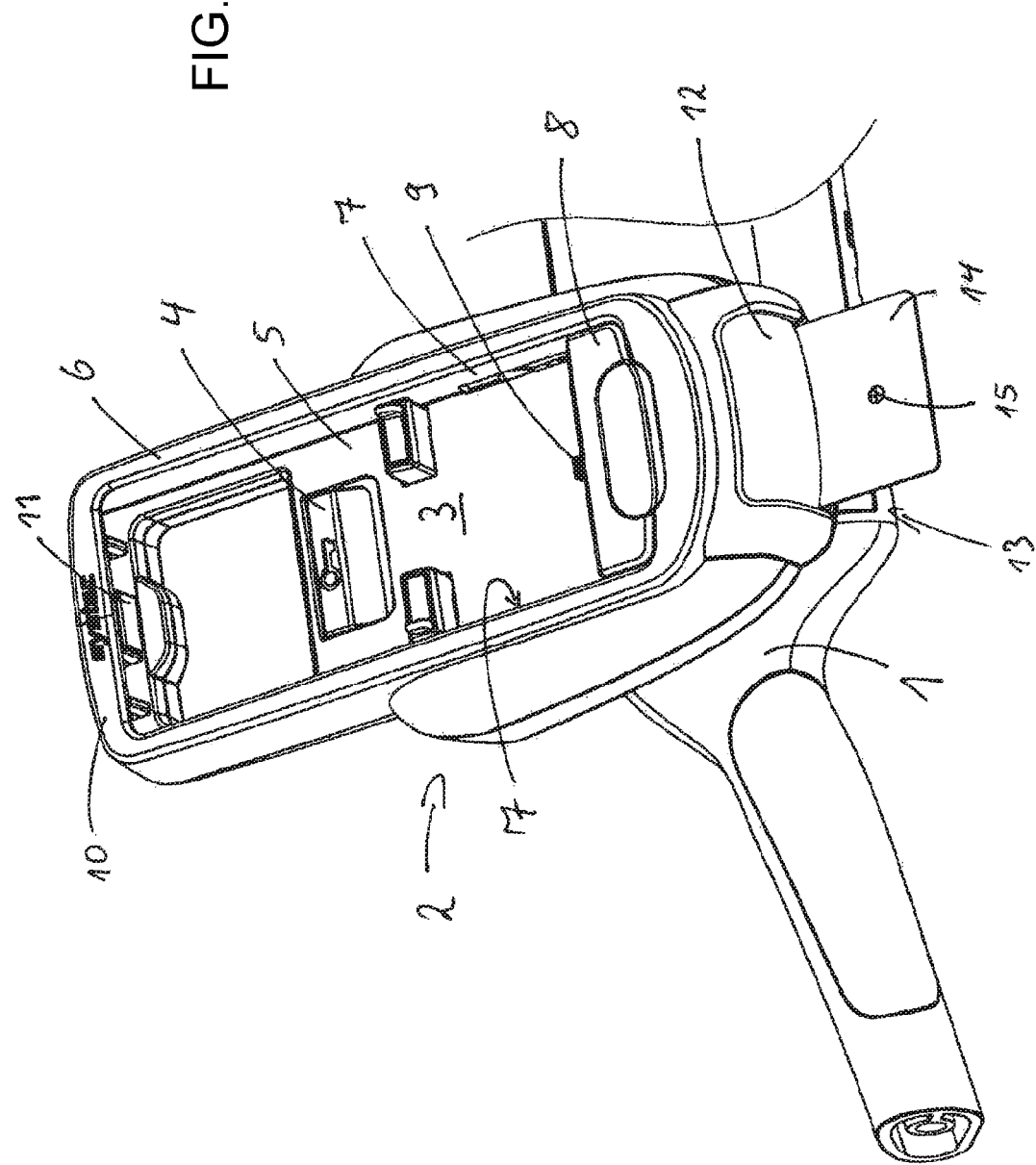
FIG. 1 shows a perspective view of a holder 2 inserted into a shopping trolley handle 1, FIG. 2 a section along the longitudinal axis of the holder 2 according to FIG. 1.

The holder 2 comprises a receptacle 3 for a smartphone. Since no smartphone is held in the receptacle 3, a releaser 4 for unlocking a second locking mechanism is not concealed. The releaser 4 has the form of a button which is arranged in an opening in the base 5 of the receptacle 3. The receptacle has a border 6 which projects from the base 5. A spring-loaded carriage 8 is guided between the inner edges 7 of the two long sides of the border, which is thus held such that is displaceable in the holder 3 in the longitudinal direction. On one edge of the carriage 8 facing the receptacle 3 an electronic interface 9 is arranged. The inside of the transverse side 10 of the border 6 opposite the carriage 8 has a limit switch 11 which detects the contact of a smartphone that is pressed against the transverse side 10 by the carriage 8. The holder 3 additionally comprises a card reader 12, in the card slot 13 of which a card 14 is inserted. The card 13 has two mirrored perforations along the transverse axis of the card, of which only the perforation 15 is visible.

Figure 2:
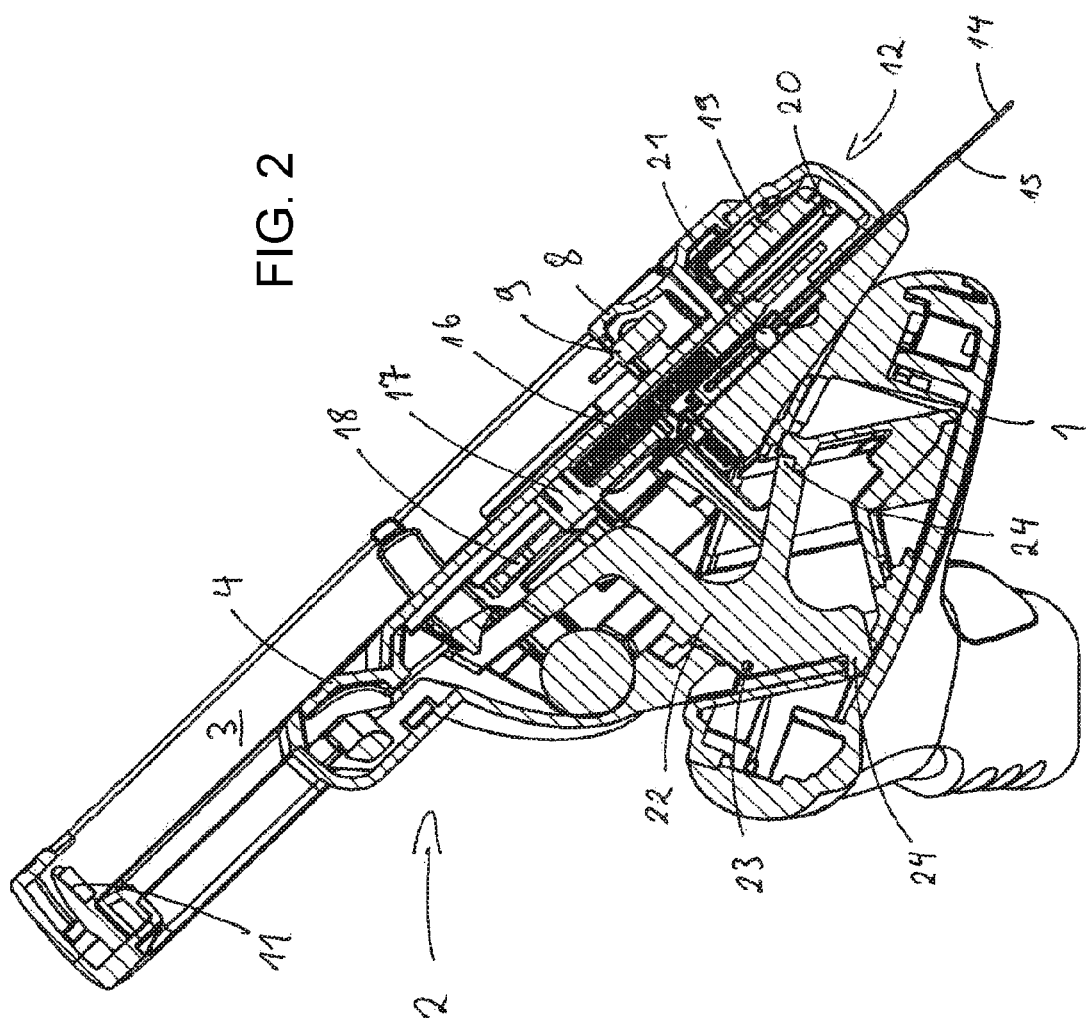

In the sectional drawing shown in FIG. 2, all cut surfaces have the same hatching, regardless of whether they are to be associated with separate parts or not. The carriage 8 comprises a kind of toothed rack 16, which in the event of movement of the carriage 8 in the longitudinal direction of the receptacle 3, is guided along a gear wheel 17 which it sets into rotation. The carriage is locked via a gear wheel 18 that is arranged coaxially to the gear wheel 17 and connected thereto, the radius of which is several times greater. To provide the blocking, a mechanism engages with the teeth of the co-rotating gear wheel 18 and thus locks the mechanism.

In addition to its electronics 19 the card reader 12 comprises an RFID antenna 20, and a blocking element in the form of a pin 21, which can prevent a complete insertion of the customer card 14, or if a customer card 14 is already inserted, engage with one of its openings 15 and prevent removal.

Activation of the pushbutton 4 rotates a spring-loaded pin, in the form of a rocker 22 fastened in the holder 2, about its axis 23. The rocker 22 has two undercuts 24 which lock the holder 2 in the handle of the shopping trolley 1 in a locking position. The rotation releases the undercuts 24 positioned opposite each other from their locking position and enables the holder 2 to be removed from the handle 1.

A preferred design variant of the holder according to the invention with a fastening mechanism is also described in detail on the basis of two drawings. In these, FIG. 3 shows a plan view of a holder with a retaining bracket in the basic position and FIG. 4 shows a plan view of the holder according to FIG. 1 with a smartphone seated in the receptacle.

The holder 50 shown in FIG. 3 has a receptacle 51 for a smartphone. The receptacle 51 comprises a fixed part 52 and a retaining bracket 53 which is movably mounted on the holder 50. The retaining bracket 53 engages with the longitudinal arms 52a, 52b of the fixed part 52 and is displaceably mounted there. The engagement prevents the fastening mechanism from being freely accessible and tampered with.

On a transverse side of the receptacle 51 formed from the fixed part 52, an electronic interface 54 based on a current standard is arranged, to which a smartphone can be connected.

The holder 50 has an insertion opening 55, in which a token 56 is held. A slider 58 is movably mounted in a groove 57 of the fixed part 52. The slider 58 in FIG. 3 is located in its second position, in which the fastening mechanism is unlocked. The mechanism is therefore not blocked and the U-shaped retaining bracket 53 can be withdrawn from the arms 52a, 52b, in order to allow a smartphone to be inserted into the receptacle 51.

In the basic position of the retaining bracket 53, shown in FIG. 3, on the fixed part 52, due to its spring tension the retaining bracket 53 has been introduced so far into the arms 52a, 52b that when a smartphone placed on the interface 54 is tilted into the receptacle 51, its rear face comes into contact with a top edge 59 of the retaining bracket 53. If the retaining bracket 53 is now withdrawn against the spring tension of the arms 52a, 52b, the receptacle 51 becomes larger. Depending on the size of the smartphone to be inserted, at some point the receptacle 51 will be sufficiently long that the smartphone no longer comes into contact with the top edge 59, but can be fully inserted into the receptacle 51. Since the lower edge 60 of the retaining bracket 53 either protrudes further into the receptacle 51 compared to the top edge 59, or forms a tongue 60, the smartphone seated in the receptacle comes to rest here. If the retaining bracket 53 is now released, it is pressed by the spring tension against the top outer edge of the smartphone.

FIG. 4 shows a smartphone 61 seated thus in the receptacle 51. The smartphone 61 rests on the tongue 60 which is concealed thereby, and its top outer edge 62 abuts against the inner side of the bracket 53. This abutment is preferably effected by undercuts, so that the smartphone is held between the tongue 60 and the top edge 59 of the bracket 53. The bottom edge 63 of the smartphone also engages behind the fixed part 52 on the lower transverse side of the receptacle 51. Any unauthorized removal of the smartphone 61 would then only be feasible by destroying the holder 50, and very likely damaging the smartphone 61.

In this position of the smartphone 61, the slider 58 can be shifted into the first position shown in FIG. 4, in which the retaining bracket 53 is locked and can no longer be moved. If the locking has taken place, this is indicated by the token 56 being pushed slightly out of the insertion opening 55. The customer using the holder then knows that his smartphone is locked and he can remove the token 56.

The invention claimed:

1. A holder for a smartphone, the holder comprising:
   a receptacle for the smartphone;
   a first locking mechanism configured for locking the smartphone in the receptacle;
   a second locking mechanism configured for locking the holder with said receptacle to a shopping trolley; and
   a releaser for unlocking said second locking mechanism for releasing the holder from the shopping trolley;
   wherein, when the smartphone is being held in said receptacle, said releaser is concealed by the smartphone.

2. The holder according to claim 1, wherein said second locking mechanism comprises at least one spring-loaded pin, which engages with an opening or recess formed in the holder.

3. The holder according to claim 2, wherein said releaser is a pushbutton disposed to interact with said spring-loaded pin such that a movement of said pushbutton removes said pin from said opening in the holder.

4. The holder according to claim 1, wherein said first locking mechanism comprises a spring-loaded carriage displaceably mounted in said receptacle and configured for locking in a plurality of end positions.

5. The holder according to claim 4, wherein said spring-loaded carriage has an electronic interface for a smartphone.

6. The holder according to claim 5, which further comprises an energy storage device, and wherein energy can be transferred from said energy storage device to the smartphone over said interface.

7. The holder according to claim 1, which further comprises a third locking mechanism for locking the holder in a base station, said third locking mechanism having a pin for engaging in a second opening formed in the holder.

8. The holder according to claim 7, wherein one or both of said second and third locking mechanisms comprise a tongue and groove system.

9. The holder according to claim 1, which further comprises a card reader with a card slot and an electronically adjustable blocking element configured, in a blocking position thereof, to prevent a complete insertion of a card into said card slot.

10. A system for fastening a smartphone to a shopping trolley handle, the system comprising:
    a holder according to claim 1;
    a smartphone to be placed in a receptacle of said holder; and
    the shopping trolley handle mounted on a shopping trolley; and
    wherein the second locking mechanism is configured for releasably locking said holder to said shopping trolley handle and the releaser for releasing said second locking mechanism is concealed by said smartphone seated in the holder.

11. A base station for accommodating a plurality of holders according to claim 1, wherein a third locking mechanism for locking a respective holder in the base station can be electronically locked and/or unlocked.

12. A method for fastening a smartphone to a shopping trolley handle, the method comprising:
   providing a holder according to claim 1;
   inserting and locking a smartphone in a receptacle of the holder;
   subsequently fastening the holder with the smartphone to the shopping trolley handle, wherein a lock to the shopping trolley handle can only be released after removal of the smartphone from the holder.

13. The method according to claim 12, which comprises completely inserting a card into a card slot of a card reader of the holder in order to release the locking of the smartphone in the holder.

14. The method according to claim 13, wherein a blocking element prevents a full insertion of the card into the card slot and only enables the insertion after an authorization check of the card.

15. The method according to claim 12, which comprises mechanically releasing the lock to the shopping trolley handle by pressing a pushbutton.

\* \* \* \* \*